(12) United States Patent
MacNeil

(10) Patent No.: US 8,621,707 B2
(45) Date of Patent: Jan. 7, 2014

(54) INTAKE CONTROL FOR BLOWER IN VEHICLE WASH SYSTEM

(75) Inventor: Daniel J. MacNeil, Barrie (CA)

(73) Assignee: Ryco Canada, Inc., Grimes, IA (US)

( * ) Notice: Subject to any disclaimer, the term of this patent is extended or adjusted under 35 U.S.C. 154(b) by 1238 days.

(21) Appl. No.: 12/382,617

(22) Filed: Mar. 19, 2009

(65) Prior Publication Data

US 2009/0235554 A1  Sep. 24, 2009

Related U.S. Application Data

(60) Provisional application No. 61/064,688, filed on Mar. 20, 2008.

(51) Int. Cl.
*A47L 5/38* (2006.01)

(52) U.S. Cl.
USPC .............. 15/301; 15/316.1; 15/405; 15/415.1

(58) Field of Classification Search
USPC ............................... 15/301, 316.1, 405, 415.1
See application file for complete search history.

(56) References Cited

U.S. PATENT DOCUMENTS

| | | | |
|---|---|---|---|
| 2,189,895 A | 2/1940 | Grutzner | |
| 3,011,203 A | 12/1961 | Holtzclaw | |
| 3,446,272 A | 5/1969 | Gaines, Jr. | |
| 3,759,056 A | 9/1973 | Graber | |
| 4,305,418 A | 12/1981 | Jensen et al. | |
| 4,789,941 A | 12/1988 | Nunberg | |
| 4,836,467 A | 6/1989 | Rodgers | |
| 4,929,150 A | 5/1990 | Daw | |
| 5,173,692 A | 12/1992 | Shapiro et al. | |
| 5,324,167 A | 6/1994 | Moczadlo et al. | |
| 5,333,835 A | 8/1994 | Smith et al. | |
| 5,454,136 A | 10/1995 | Gougoulas | |
| 5,886,648 A | 3/1999 | McElroy et al. | |
| 6,527,194 B1 | 3/2003 | Burke | |
| 6,530,115 B2 * | 3/2003 | MacNeil | 15/316.1 |
| 6,735,884 B2 * | 5/2004 | Fratello et al. | 34/487 |
| 6,843,455 B1 * | 1/2005 | Wentworth et al. | 248/200.1 |
| 2004/0250372 A1 * | 12/2004 | McElroy | 15/316.1 |
| 2006/0218818 A1 | 10/2006 | Christopher | |

* cited by examiner

*Primary Examiner* — Lee D Wilson
*Assistant Examiner* — Shantese McDonald
(74) *Attorney, Agent, or Firm* — Smart & Biggar

(57) ABSTRACT

A vehicle wash system may have a drying station that may have a frame and a blower mounted on the frame. The blower may be used blowing liquid from the surface of a vehicle and may have a plenum with a cavity opening, an exit port, and an interior cavity. An impeller may be positioned inside the cavity, and when driven by a motor, may be operable to draw air into the cavity compress the air, and then emit an airflow from the plenum through the exit port. The blower may have an inlet region formed proximate the cavity opening and be in communication with the cavity. The inlet region may have a generally tubular inlet opening. A movement apparatus may be provided that is movable axially relative to the inlet opening to vary the size of the tubular inlet opening. The system may also include a sensor system operable to detect the presence and/or absence of a vehicle at drying station. A controller may be in communication with the sensor system and be operable to control the position of the movement device dependent upon the presence and/or absence of a vehicle to be dried.

18 Claims, 15 Drawing Sheets

INTAKE CONTROL FOR BLOWER IN VEHICLE WASH SYSTEM

CROSS-REFERENCE TO RELATED APPLICATION

This application claims priority from U.S. provisional application No. 61/064,688, filed Mar. 20, 2008, the contents of which are hereby incorporated herein by reference.

FIELD OF THE INVENTION

The present invention relates generally to blowers used in vehicle wash systems.

BACKGROUND OF THE INVENTION

Blowers are used in the drying section of vehicle wash systems. In both conveyor/tunnel-type wash systems and "roll-over" type vehicle wash systems, the drying section is typically located just before the vehicle exits the wash system. The drying section of a wash system may be comprised of a plurality of air blowers mounted on a frame. The air blowers are employed to dry the vehicles by forcing a stream of air over the surface of the vehicle. The stream of air may also be heated above ambient temperature. Such blowers are commonly referred to as "dryers" in vehicle wash systems.

Each dryer typically has an outer housing or plenum enclosing a cavity that contains an impeller. The impeller may be connected to, and rotated by, the drive shaft of a motor. The motor may be an electric motor. The motor causes the impeller to draw in the gas (e.g. air) into the plenum, compress it, and then expel the compressed gas through an exit port, from the plenum. The exit port may have a nozzle associated therewith, to assist in directing the flow of air. The result is that a blower employed in a vehicle wash system can direct a high speed and volume of airflow over a vehicle surface to rapidly dry the vehicle before it exits the wash system.

The operation of blowers in vehicle wash systems may be controlled by a controller. For example, to conserve power, a relatively simple controller can be provided that is operable to switch the supply of power to the motor on and off, depending upon whether or not a vehicle is in the drying section of the vehicle wash system. The presence of a vehicle in the drying section can be detected by a known type of sensor. However, such blower control systems do not significantly address the intermittent nature of vehicle traffic in a wash system. It is not desirable to simply start and stop the blower motors as each vehicle passes into and out of the drying section.

It should be noted that starting and stopping an electric motor to achieve intermittent blower operation is disadvantageous. For example, when an electric motor is started, it generates a high transient peak load and often a large amount of heat. The high peak load may be undesirable as wash system operators may be charged more by their electrical utilities if there are peaks in their electricity demand, resulting in higher operational costs. The high peak load generated when starting an electric motor is compounded in a wash system since the drying section may have a plurality of blowers, many of which may be started at approximately the same time.

Also, frequently starting and stopping a blower motor decreases the life span of the motor, resulting in overall higher operating costs. Additionally, the large amount of heat generated upon starting and stopping an electric motor limits the rate at which the motor may be started and stopped. The amount of heat generated may be so significant that the blower cannot feasibly be started and stopped for each vehicle. Furthermore, starting and stopping the blower motor is relatively slow and may limit the capacity of the drying section.

However, operating the motors continuously under load results in unnecessary wear and tear on the blowers and is not energy efficient, both factors resulting in increased operating costs. A further disadvantage of continuously operating the blowers is that the blowers when being operated under load create a high noise level, particularly when no vehicle is present in the drying section to dampen the sound.

Previous attempts have been made to try to overcome some of these problems, but these methods are deficient in other ways. For example, a variable speed motor (variable frequency drive motor) could be employed, but there are significant additional costs associated with such motors. Additionally, variable speed motors may result in higher levels of electrical noise, compared to constant speed motors.

It is also known to operate the blower motor continuously, but having an outlet valve device, whereby the exit port is only opened when a vehicle is in position to be dried. This approach allows the fan to be operated under a reduced load when the exit port is closed, reducing electricity usage and noise. However, restricting or blocking the exit port creates an undesirable back-pressure that may reduce the life span of the blower components. Furthermore, to limit the flow through the exit port, the components must be capable of providing sufficient force to overcome the high velocity airflow to secure the closure of the exit. Consequently, placing the control mechanism at the exit port results in increased cost and places the control system and other blower components under increased stress.

It is also known to control the flow of air through a blower in a vehicle wash system by controlling the flow at the inlet using one or more damper devices. However, there are significant disadvantages to the known inlet control devices, particularly in the manner in which the flow of air into an air blower is regulated. Sustainable operation of known blower systems in wash systems at less than full capacity has proved difficult in the past. For example, it is known to employ a valve plate as a valve mechanism to control the amount of air entering the blower; however this results in an unbalanced load being distributed over the impeller when the intake damper is not in the fully open or fully closed positions. Similarly, it is known to employ louvers to block the air flow at the inlet, but this may disturb the uniformity of the air entering the blower when rotated to a partially open position and provide non-uniform input air flow on the impeller. The louvers may also be required to be positioned a minimum distance from the impeller for optimal performance, particularly if rotated to a partially open position, rendering it difficult to design a compact blower system.

Additionally, known systems for drying vehicles do not accommodate variations in the types of vehicle being dried or distinguish between different part of the same vehicle, by varying the amount of air flow directed to the vehicle or specific parts thereof.

Accordingly, a vehicle drying system with an improved air flow control system for the air blowers, is desired.

SUMMARY OF THE INVENTION

According to one aspect of the invention there is provided a blower for use in a vehicle wash system, the blower comprising: a plenum having a cavity inlet opening, an exit port and an interior cavity; an impeller positioned inside the interior cavity, the impeller, when driven by a motor, being operable to draw air into the cavity through the cavity opening, compress the air, and then emit an airflow from the plenum through the exit port; a baffle member positioned in fixed spaced, generally parallel relation to the cavity opening and defining an inlet region between the baffle member and the cavity opening, the baffle member having a peripheral edge and the plenum having an outward facing surface portion proximate the cavity opening; a valve sleeve mounted on and surrounding the peripheral edge of the baffle member in sufficiently close proximity to provide a substantial air seal, the valve sleeve being movable axially relative to the baffle member, the valve sleeve having an inner surface, the inner surface of the valve sleeve and the outward facing surface of the plenum defining an inlet opening to the inlet region, and there being an inlet opening distance defined as a distance between the inner surface of the sleeve and the outward facing surface of the plenum; and a reciprocating movement device interconnected to the valve sleeve, the device operable to axially move the sleeve to vary the distance, thus varying the inlet opening distance wherein during operation of the blower, substantially all the air drawn into the cavity passes through the inlet opening to the inlet region.

According to another aspect of the invention there is provided a vehicle wash system having a drying station comprising: (i) a frame; (ii) a blower mounted on the frame for blowing liquid from the surface of a vehicle comprising: a plenum, having a cavity opening, an exit port, and an interior cavity; an impeller positioned inside the cavity, the impeller, when driven by a motor, being operable to draw air into the cavity through the cavity opening, compress the air, and then emit an airflow from the plenum through the exit port; an inlet region formed proximate the cavity opening and in communication with the cavity, the inlet region having a generally tubular inlet opening; a movement apparatus movable axially relative to the inlet opening to vary the size of the tubular inlet opening; (iii) a motor for driving the impeller of the blower; (iv) a sensor system operable to detect the presence and/or absence of a vehicle at the drying system; (v) a controller in communication with the sensor system, and the controller being operable to control the position of the movement device dependent upon the presence and/or absence of a vehicle to be dried at the drying station.

According to a further aspect of the invention there is provided a method of drying a vehicle in a wash system using a blower system, the blower system comprising: (a) a blower comprising: a plenum, having a cavity opening, an exit port, and an interior cavity; an impeller positioned inside the cavity, the impeller, when driven by a motor, being operable to draw air into the cavity through the cavity opening, compress the air, and then emit the compressed air from the plenum through the exit port; a baffle member positioned in spaced, generally parallel relation to the cavity opening, the baffle member having a peripheral edge and the cavity opening having a peripheral edge, the peripheral edge of the baffle member and the peripheral edge of the cavity opening defining an inlet opening there between; a valve sleeve mounted on and being in connection with, the peripheral edge of the baffle member, the valve sleeve having an inner face that defines a distance between the inner face of the sleeve and the peripheral edge of the cavity opening; a reciprocating movement device interconnected to the valve sleeve, the device operable to axially move the sleeve to vary the distance, thus varying the size of the inlet opening; (b) a motor for driving the impeller of the blower; the method comprising; (a) driving the impeller with the motor; (b) determining that a vehicle is in a condition appropriate for drying the vehicle; (c) in response to the determining, moving the sleeve to vary the distance thereby providing an opening at the inlet opening to permit air to be drawn through the inlet opening; (d) determining that a vehicle is no longer in a condition appropriate for drying the vehicle; and (e) in response to the determining, moving the sleeve to vary the distance thereby closing the opening at the inlet opening to prevent air to be drawn through the inlet opening.

According a still further aspect of the invention there is provided a method of retrofitting a wash system comprising: removing a first blower from a blower support frame located in the wash system; installing a second blower to the blower support frame, wherein the second blower comprises: a plenum, having a cavity opening the cavity opening having a peripheral edge, the an exit port and an interior cavity; an impeller positioned inside the cavity, the impeller, when driven by a motor, being operable to draw air into the cavity through the cavity opening, compress the air, and then emit an airflow from the plenum through the exit port; an opening closure device positioned in spaced, generally parallel relation to the cavity opening, the closure member having a peripheral edge positioned generally opposite to the peripheral edge of the cavity opening, the peripheral edge of the closure member and the peripheral edge of the cavity opening defining an inlet opening there between; the closure device being mounted for axial movement relative to the cavity opening; and a reciprocating movement device interconnected to the closure device, the device operable to axially move the closure device to vary the size of the inlet opening.

According another aspect of the invention there is provided a method of drying a vehicle in a wash system using a blower system, the blower system comprising: (a) a blower comprising: a plenum, having an intake opening, an exit port, and an interior cavity; an impeller positioned inside the cavity, the impeller, when driven by a motor, being operable to draw a air into the cavity through the intake opening, compress the air, and then emit the compressed air from the plenum through the exit port; a valve device positioned to vary the size of the inlet opening; (b) a motor for driving the impeller of the blower; the method comprising; (a) driving the impeller with the motor; (b) determining that a vehicle is in a condition appropriate for drying the vehicle; (c) determining at least one of the size and type of the vehicle; and (d) in response to the determining of at least one of the size and type of the vehicle, varying the size of the intake opening at the inlet opening to control the amount of air to be drawn through the intake opening.

According to yet another aspect of the invention there is provided a method of drying a pickup truck in a wash system comprising: (a) determining that a vehicle is in a condition appropriate for drying; (b) in response to the determining the vehicle is in a condition appropriate for drying, operating a blower in a first condition to provide a first airflow to the portion of vehicle in a condition appropriate for drying; (c) determining that the vehicle is a pickup truck; (d) in response to the determining that the vehicle is a pick up truck, operating the blower in a second condition to provide a second airflow to the pickup truck.

According to a further aspect of the invention there is provided a system of drying a pickup truck in a wash system comprising: (a) a blower system; (b) a sensor system; (c) a control system; the sensor system communicating signals to the control system such that the control system can determine that a vehicle is in a condition appropriate for drying; the control system, in response to the determining the vehicle is in a condition appropriate for drying, operating a blower in a first condition to provide a first airflow to the portion of vehicle in a condition appropriate for drying; the sensor system communicating signals to the control system such that the control system can determine that the vehicle is a pickup truck; the control system, in response to the determining that the vehicle is a pick up truck, operating the blower in a second condition to provide a second airflow to the pickup truck.

According to a still further aspect of the invention there is provided a method of drying a vehicle in a wash system comprising: (a) determining a vehicle is in a condition appropriate for drying; (b) operating a blower in a first condition to provide a first airflow to the vehicle; (c) electronically determining that the vehicle is a pickup truck having a bed; (d) determining the bed is in a condition appropriate for drying; and operating a blower in a second condition to provide a second airflow to the bed of the pickup truck.

According to another aspect of the invention there is provided a method of drying a vehicle in a wash system comprising: (a) determining a vehicle is in a condition appropriate for drying with a drying system; (b) electronically determining which type of vehicle, of a plurality of different types of vehicles, the vehicle is; (c) based on the determination of the type of the vehicle, operating the drying system in a condition dependent upon the type wherein the drying system is comprised of at least one blower and the condition of the drying system is varied by varying the airflow exiting the blower.

Using the blower and control system of the present invention, the amount of air flow delivered at any particular time may be varied dependent upon on one or more of several factors such as for example, the size of the vehicle to be dried, the type of the vehicle to be dried, the time of day and the associated cost of electricity at peak times during the day, and the outside ambient temperature. For example, it may be desirable to use a reduced airflow on convertible roofs and portions of pickup trucks in order to optimize drying performance and minimize possible damage to vehicle components.

In general, the ability to control the amount of airflow exiting the blower allows the flow to be optimized, thus extending the life of the blower components and also possibly reducing the noise generated by the blower. With the present invention, the amount of air being delivered by the blower may be accurately and easily controlled.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

As referenced above, wash systems typically include a drying section to remove water from the vehicle surface, employing high velocity and high volume air, before the vehicle exits from the wash system. Illustrative examples disclosed hereinafter make reference to drying sections included in conveyor type wash systems, although the blower systems may also be applicable to rollover or other types of wash systems, with any required suitable modification.

Figure 1:
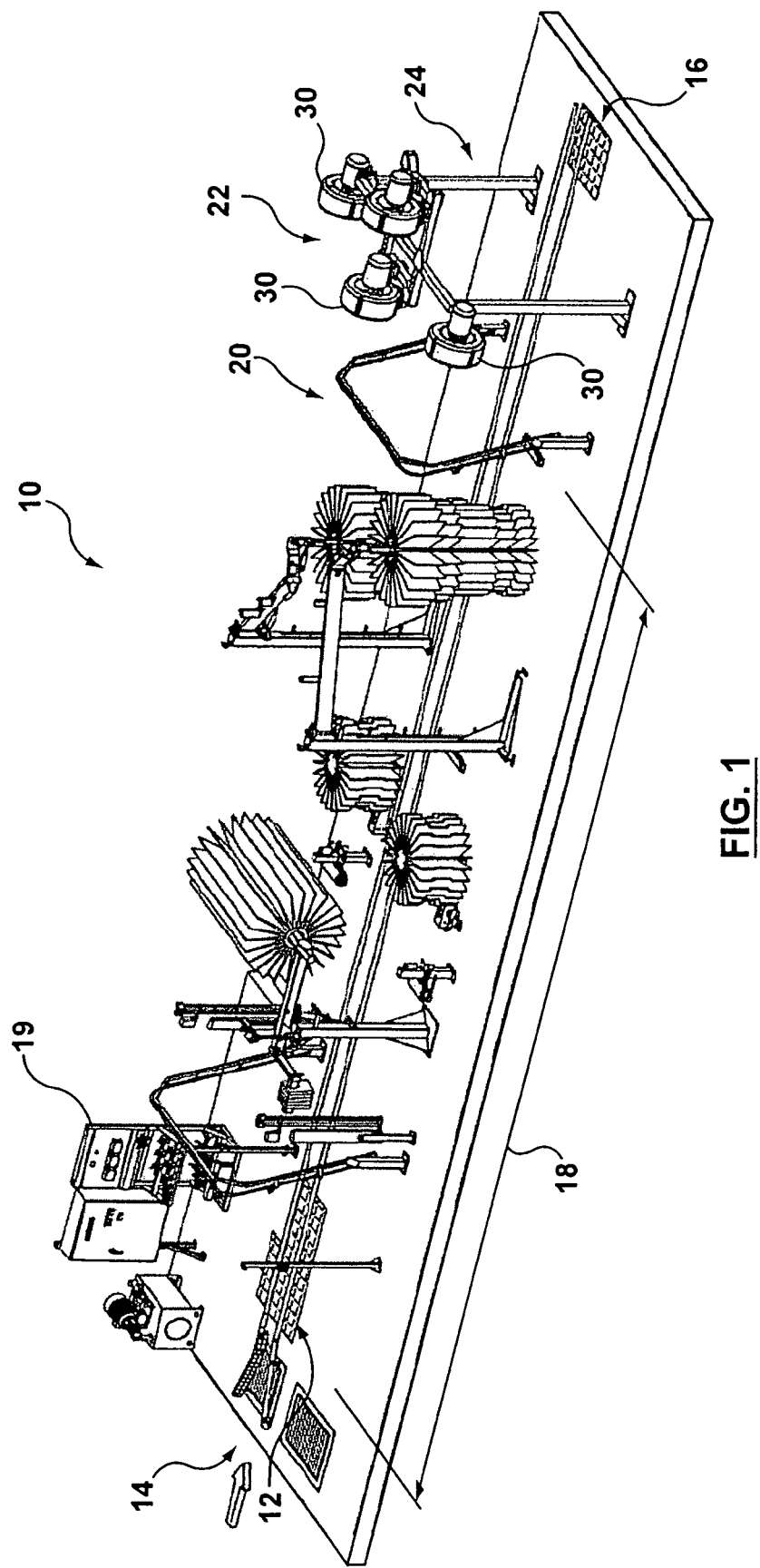
FIG. 1 is a perspective view of an exemplary conveyor wash system employing a blower system.

FIG. 1 illustrates an exemplary layout of a conveyor type wash system 10, the basic components of which are known in the art. Vehicles (not shown) may enter the wash system 10 at position 14 and may engage a conveyor system 12. The conveyor system 12 may provide for the movement of each vehicle as it proceeds through system 10 and ultimately exits at position 16.

Upon entry to wash system 10, a vehicle may pass through a wash section 18, which may be comprised of a series of brushes, as shown in FIG. 1. Alternatively, wash section 18, may be a touch-less type wash section, that may have a plurality of high-pressure spray nozzles which can direct washing fluid onto the outer surface of the vehicle. Other embodiments for wash section 18 are also contemplated.

Following wash section 18, a rinse section 20 may cleanse the vehicle of any dirt, detergent or other treatments that have been applied in the wash section.

Figure 2:
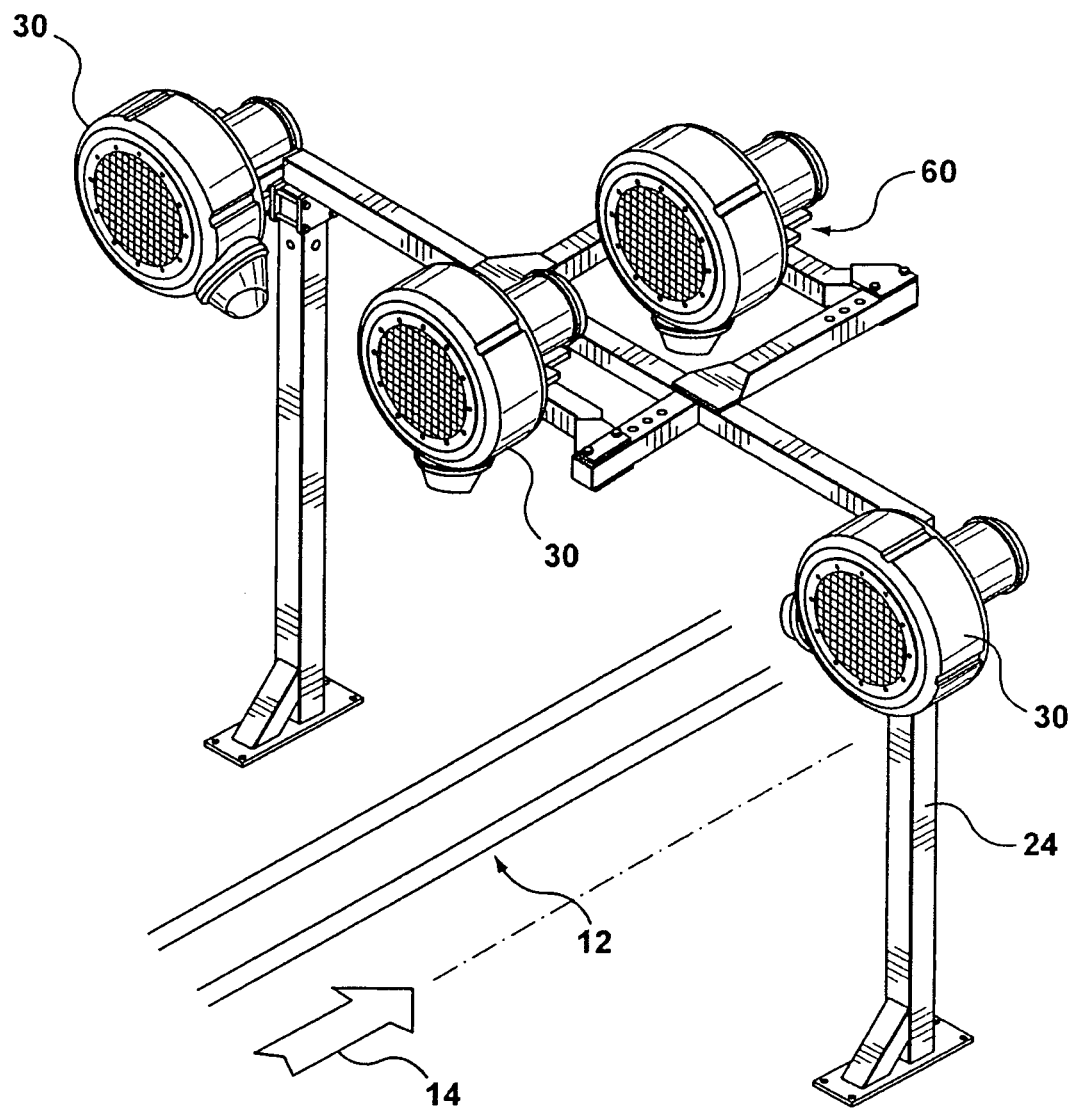
FIG. 2 is an enlarged perspective view of the drying section shown in FIG. 1.
Figure 6:
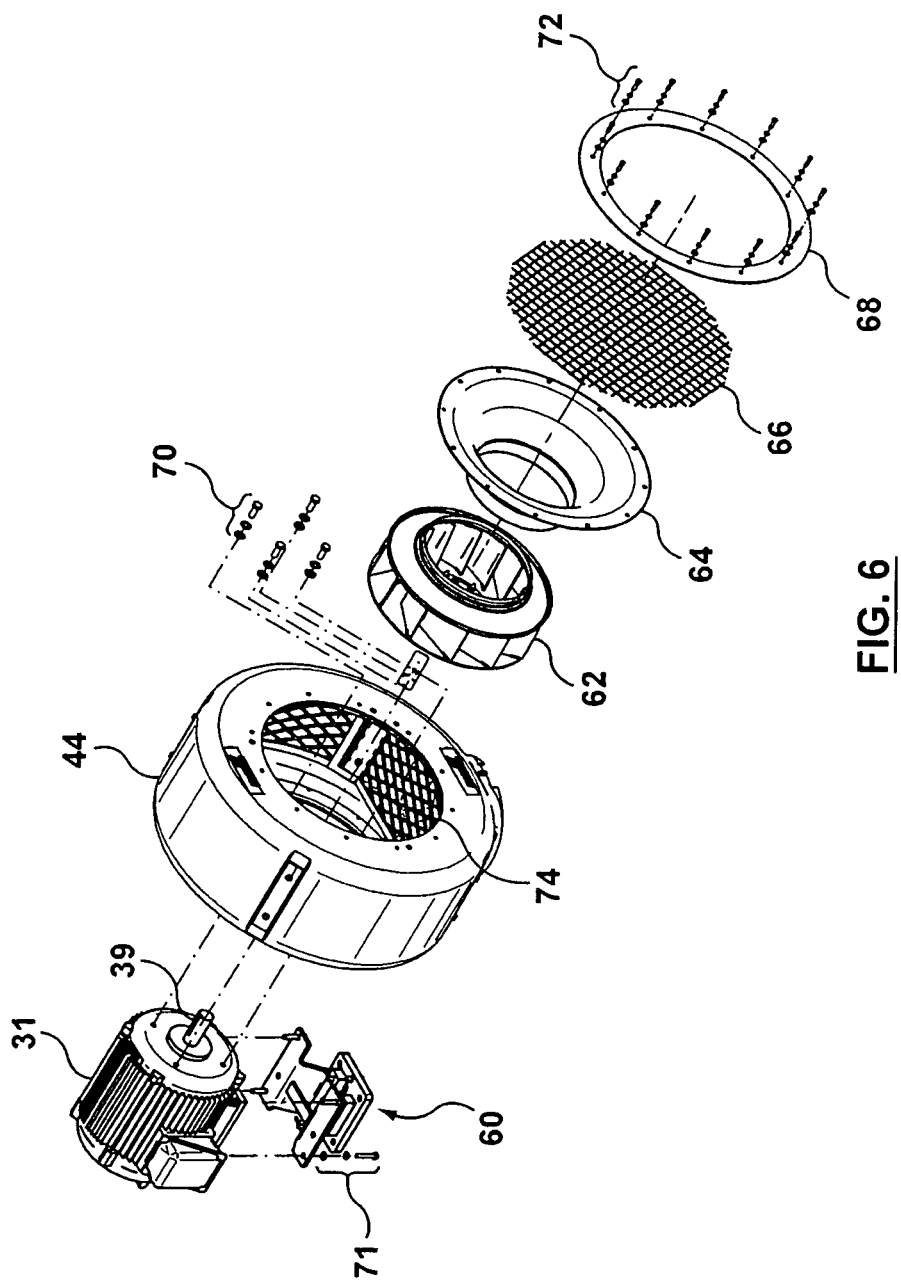
FIG. 6 is an exploded perspective view of the blower plenum of FIGS. 4 and 5, with a motor assembly for the same.

Drying section 22 may be located after wash section 18 and rinse section 20. Drying section 22 may include a plurality of blowers 30 affixed to a support frame 24. Each blower 30 may be supported in different ways, such as a support frame 24, in a manner that suits the particular application and configuration that is desired. One suitable method of attaching a blower 30 to a support frame 24 is depicted in FIG. 2, where a blower 30 may be attached to a motor 31, the motor 31 being itself attached to the support frame 24 via an attachment bracket 60. As shown in FIG. 6, the motor 31 may be secured to the plenum 44 using, for example, a plurality of bolts and washers 70. Similarly, an attachment bracket 60 may be secured to a motor 31 using a plurality of bolts and washers 71. The particular details of the attachment bracket 60 may be varied in a number of ways, but it may be advantageous to use an attachment bracket 60 that permits some adjustment of a blower 30 relative to a support frame 24. An exemplary adjustable mounting bracket is described in U.S. Pat. No. 6,530,115, the contents of which are hereby incorporated herein by reference.

The blowers may be configured in a variety of different ways to direct a stream of moving air onto the surface of a vehicle located in drying section 22. Frame 24 may be comprised of a material suitable to support the weight and withstand the load imparted by the blowers 30 when in operation, such as, for example, steel, aluminum or an aluminum alloy.

Figure 3:
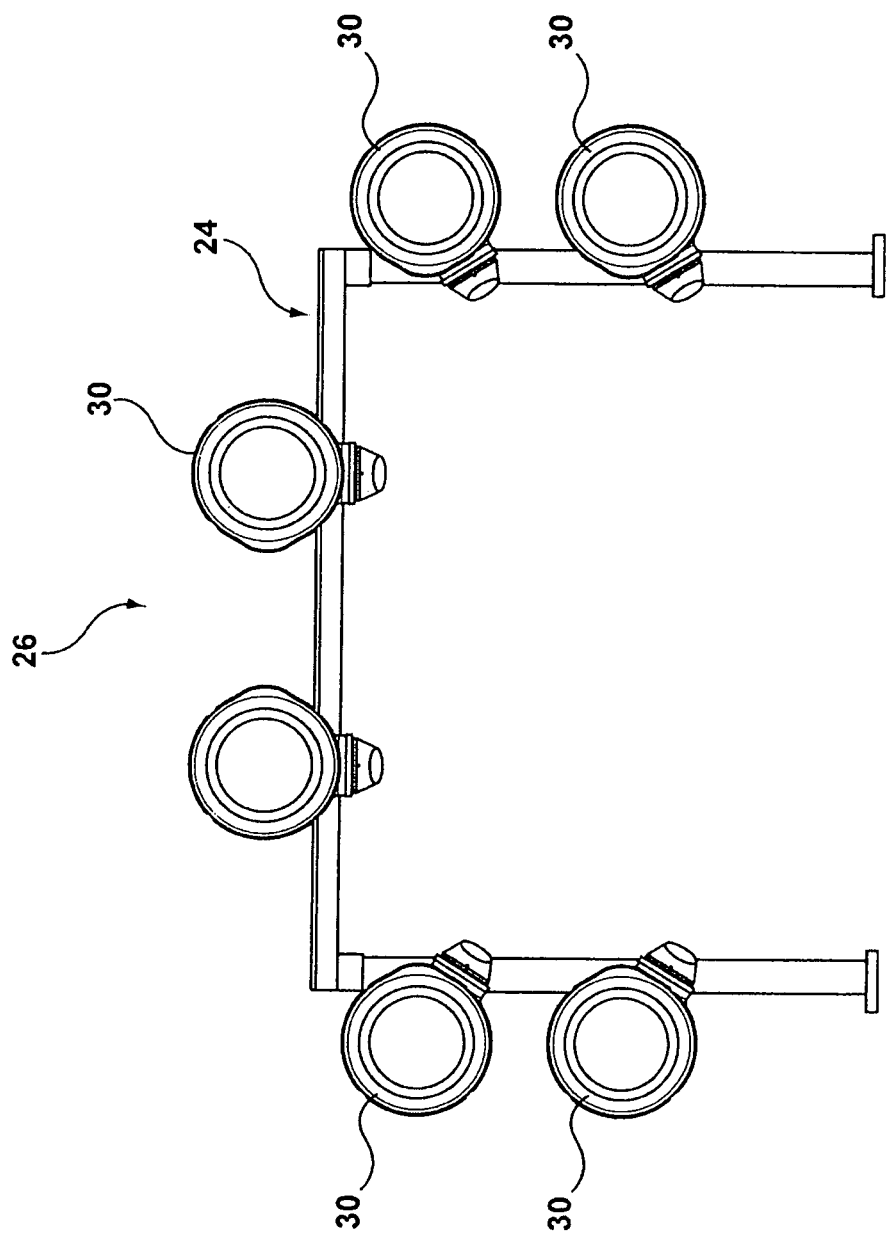
FIG. 3 is a front view of an alternative blower system configuration.

In FIGS. 1 and 2, four blowers 30 are shown in an exemplary configuration. Numerous other configurations may be employed such as, for example, the drying section 26 depicted in FIG. 3, which has six blowers 30.

Each blower 30 may be driven by a motor 31 operatively coupled to an impeller to provide a forced airflow that can be used to dry vehicles in the wash system 10. An example of a suitable motor 31 that can be employed is the model CM3711T motor made by Baldor Electric Company. Example interconnection methods to couple an electric motor to an impeller are well known in the art.

The motor 31 may be an electric motor or other suitable type of motor and will typically be a constant speed motor. However, blowers as described herein could be driven by a variable speed motor having its speed controlled by a control device.

The operation of the various components of car wash system 10 may be controlled by a central system controller 19. For example, controller 19 may be a model CCS5000 control system made by MacNeil Wash Systems. Electronic eyes or sensors in communication with the control system 19 may be used to detect the presence of a vehicle and the vehicle type in a manner known to those skilled in the art, and/or as is described below in detail.

With reference now to FIGS. 4 to 12, an individual blower 30 may have a plenum or outer housing 44, with an impeller 62 located and mounted for rotation inside an internal cavity 43. As clearly illustrated in FIG. 6, an inlet cone 64 may also be mounted inside an internal cavity 43 and function to channel air entering the plenum 44 into the hollow center region of the impeller 62. A screen plate 66 may also be employed for safety reasons to minimize the likelihood of objects entering the plenum 44. Screen plate 66 may be secured by a plurality of bolts 72 with washers, the bolts passing through aligned holes in an inlet ring 68, an inlet cone 64, and the surface of a plenum 44. Additionally, a discharge screen 74 may be mounted inside an internal cavity 43 of a plenum 44 surrounding the periphery of the impeller 62 also for safety reasons. The discharge screen 74 may have diamond shaped holes which may operate to reduce the turbulence and noise associated with the discharge screen 74.

Cavity 43 may have a cavity inlet opening 47 and an exit port generally designated 48. Cavity inlet opening 47 may be located in a side face 44a of plenum 44. Exit port 48 may be provided in plenum 44 and permits air that is drawn through inlet opening 47, to be compressed by the rotating impeller 62, and then to flow from the plenum 44 through the exit port 48 out of the blower 30. Affixed to, or formed as part of, exit port 48 may be a nozzle 51 that may be configured to focus the airflow in a specific direction and emit the air at a further enhanced flow rate.

Figure 8:
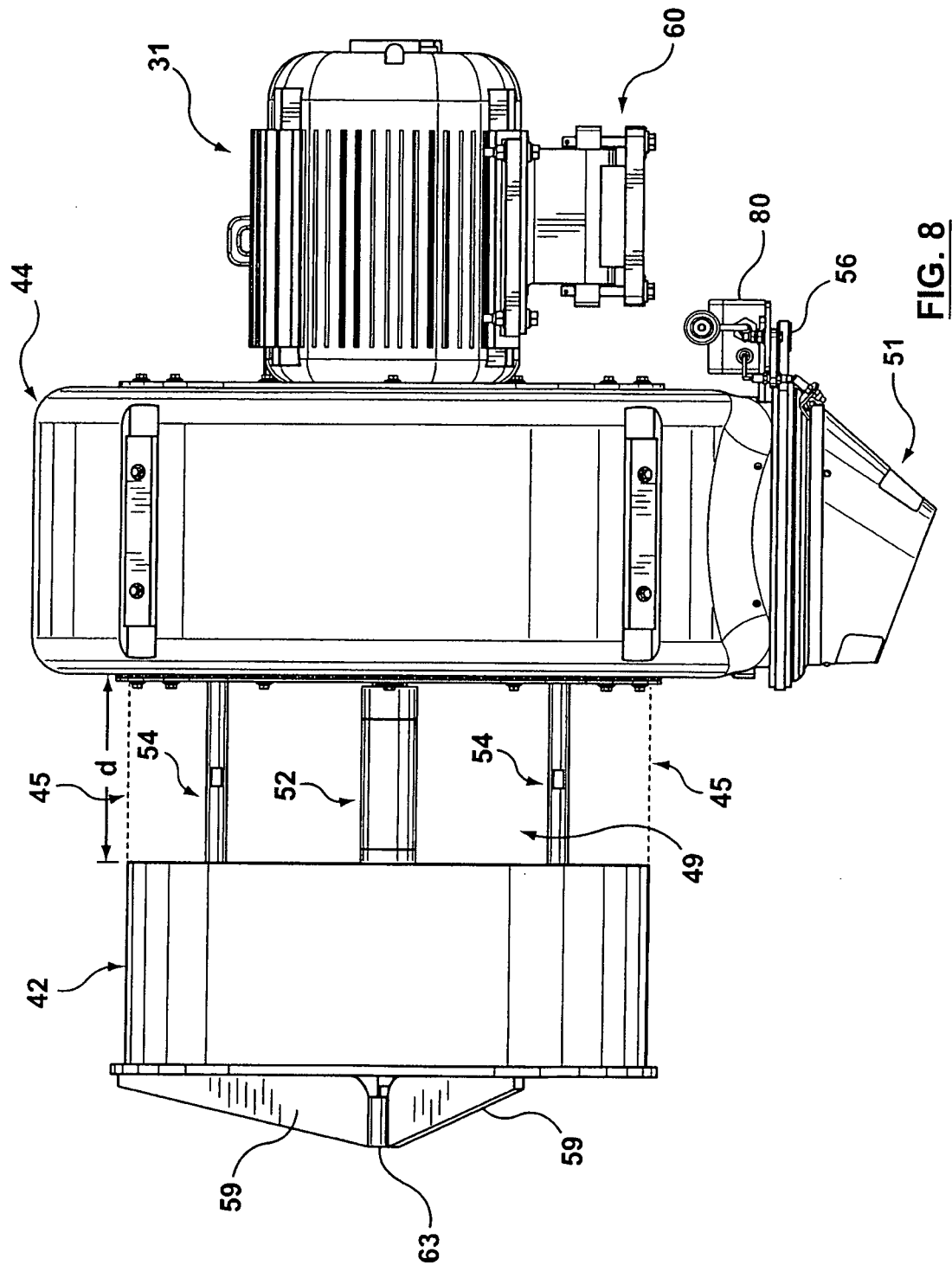
FIG. 8 is a side view of the blower plenum of FIG. 7, showing a motor assembly attached thereto.

Nozzle 51 may be capable of being rotated or otherwise having its position or orientation adjusted, through manual adjustment or by way of the operation of an electronic controller (not shown). For example, U.S. Pat. No. 6,530,115 describes a method and apparatus of providing an appropriately directed air stream from a blower in response to certain control information, including vehicle position and width data. As depicted in FIG. 8, a nozzle adjustment mechanism 80 may be attached to a plenum 44 via attachment bracket 56 in order to permit the nozzle 51 to be rotated in response to control signals provided by a controller (not shown). Other types of mechanisms/systems may be employed to provide an electronically adjustable nozzle 51.

As mentioned above, the impeller 62 located inside the plenum 44 may be rotated by the drive shaft 39 (FIG. 6) of a motor 31. When the impeller rotates, air may be drawn through cavity opening 47 into cavity 43 where it is compressed, and then exit from plenum 44 through the exit port 48 and nozzle 51.

An inlet region 49 is provided proximate and is in communication with cavity opening 47. An inlet opening 45 can be provided to inlet region 49 to provide communication with ambient air. Inlet opening 45 may be formed at the edge surface of a cylinder (of any cross sectional shape, including a circular cylinder) defined between an outward facing surface 44a of the plenum 44 (such as at the peripheral edge 47a of circular opening 47 to cavity 43), and the inward facing surface 42a of a valve sleeve member 42. Air must pass through inlet opening 45 before it can be drawn into an inlet region 49 and then pass through opening 47 into cavity 43 of plenum 44.

Plenum 44, impeller 62 and baffle plate can be manufactured from suitable materials such as plastic, aluminum, or steel.

Baffle plate 46 may be mounted to plenum 44 in fixed spaced relation to opening 47 by a plurality of transversely extending rigid rod members 54. One end of each rod 54 can be affixed to an outer surface of plenum 44 and the other end of each rod 54 is affixed to the baffle plate 46.

Blower 30 may also include valve sleeve member 42 that may be configured as a generally cylindrical housing with an inner surface 42a. Sleeve member 42 can also be manufactured from any suitable material such as plastic, or steel. Sleeve member 42 may be mounted for reciprocating axial movement towards and away from plenum 44 and in particular cavity side opening 47. In this way the size of inlet opening 45 may be varied.

The movement of sleeve member 42 may be effected by a hydraulic or pneumatic cylinder 52 that is mounted to baffle plate 46 as further described below. Inner surface 42a of sleeve 42 may engage and slide over the outer peripheral edge 46a of baffle plate 46 such that sleeve 42 may to some extent be supported on baffle plate 46.

The interconnection between inner surface 42a of sleeve 42, and peripheral edge 46a of baffle plate 46 can be such that a significant amount of air can not pass between surface 42a of sleeve 42 and the peripheral edge 46a of baffle plate 46. When mounted on, and in connection with, intake baffle plate 46, depending upon its axial position, sleeve 42 can reduce the size of the available open area of inlet opening 45 thus controlling the amount of air passing into inlet region 49. Furthermore sleeve 42 may substantially prevent air from entering inlet region 49 through inlet opening 45 when the sleeve 42 is in the closed position shown in FIGS. 4 and 5, such that the inlet opening 45 is substantially blocked.

The amount of air allowed to enter the inlet opening 45 when sleeve 42 is in the closed position may be varied to suit particular applications. For example, by varying the degree to which a seal between inner sleeve surface 42a of sleeve 42 and outward facing surface 44a of the plenum 44 is provided when sleeve 42 is in the closed position, the amount of air entering the blower 30 and consequently the amount of air exiting the blower 30 can be varied. In some embodiments, the normal manufacturing tolerances that exist in manufacturing the sleeve and plenum may provide sufficient gap to allow a suitable but substantially reduced amount of amount of airflow to continue to be emitted by the air blower when sleeve 42 is in the "closed" position. In other embodiments, a gap can be specifically provided when sleeve 42 is in the "closed" position to provide a reduced amount of air flow.

It should be noted that while sleeve inner surface 42a and baffle plate peripheral edge 46a have generally circular forms in the illustrated embodiment, other shapes can also be provided. For example, both could be formed with edges defining a square, rectangle or other polygonal shape. Also, in other embodiments, a combined closure device may be formed which does not have a separate baffle plate. In such embodiments, the entire closure device may move axially towards and away from the peripheral edge 47a of opening 47 into cavity 43. The inlet opening 45 may thus be defined by (a) an opening between the side face of the plenum, or the surface of another portion of, or member associated with, the plenum; and (b) the inner surface edge of the closure device. Thus, an inlet region like region 49 can be formed having an opening 45 the size of which can be varied by a closure device.

Likewise, the cavity opening 47 into plenum 44 does not have to be circular, but can be of another shape that is either the same as, or different from, the shape of sleeve inner surface 42a and outer peripheral edge 46a of the baffle plate 46.

A hydraulic or pneumatic system may be used to axially move the valve sleeve 42 relative to baffle plate 46 and cavity opening 47. Hydraulic or pneumatic cylinder 52 may be mounted to, and solely supported by, baffle plate 46. The cylinder section 53 of cylinder 52 may be positioned at a rear surface 46c of baffle plate 46 and have a piston rod 58 that may extend through a centrally positioned and axially aligned aperture passing through the baffle plate 46. A threaded extension from cylinder section 53 may also extend through the aperture in baffle plate 46 and engage a threaded nut 55. Thus when nut 55 is tightened, cylinder section 43 may be drawn into tight engagement with rear surface 46c of baffle plate 46, thus securely mounting the cylinder 52 to baffle plate 46.

Piston rod 58 may be free to have reciprocal movement through the aperture in baffle plate 46. The distal end 58a of piston 58 can be attached to a central hub 63 of a frame member 61. Frame member may have a plurality of legs 59 extending from hub 63 with the distal ends of the legs secured to the outward facing surface annular surface 42b of valve sleeve 42. Other means of attachment of the cylinder 52 to the baffle plate 46 or valve sleeve 42 may be employed.

Cylinder 52 may be conveniently positioned in axial alignment with the central axis of rotation of the impeller and may be a reciprocating double acting piston. The movement of rod 58 may be controlled by controlling the flow of fluid or compressed air to the double chambers of cylinder 52. This may be effected by employing electronic valves that may be activated and controlled by a suitable PLC device. An example of a suitable cylinder that might be employed is the model D-97475-A2 made by Bimba Manufacturing. The PLC used to control the operation of cylinder 52 and the associated valves, can be part of the overall system controller 19.

Figure 4:
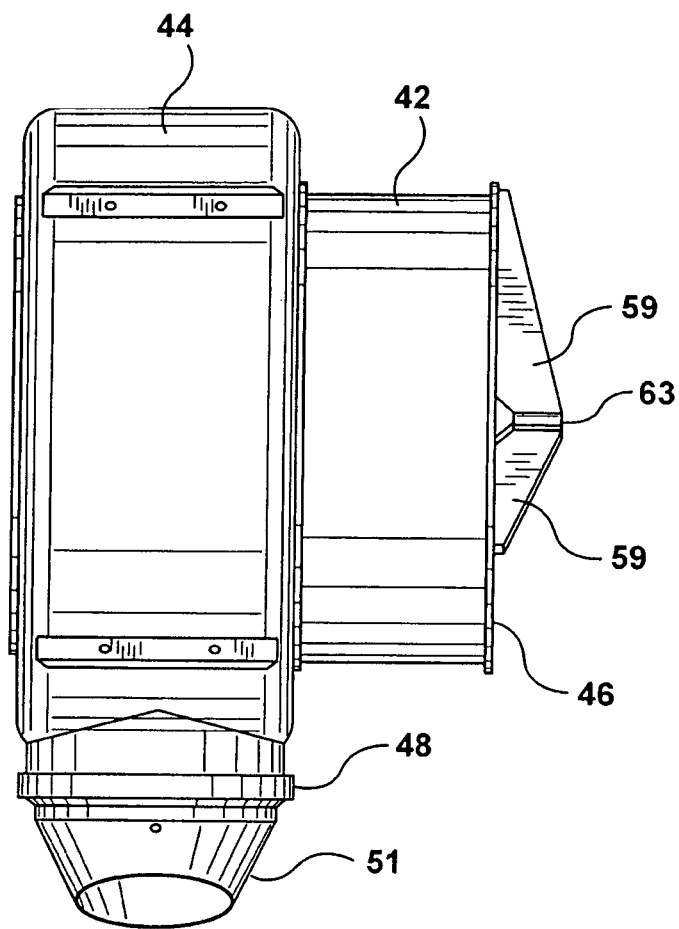
FIG. 4 is a side view of a blower plenum with its air inlet control device in the closed position.
Figure 5:
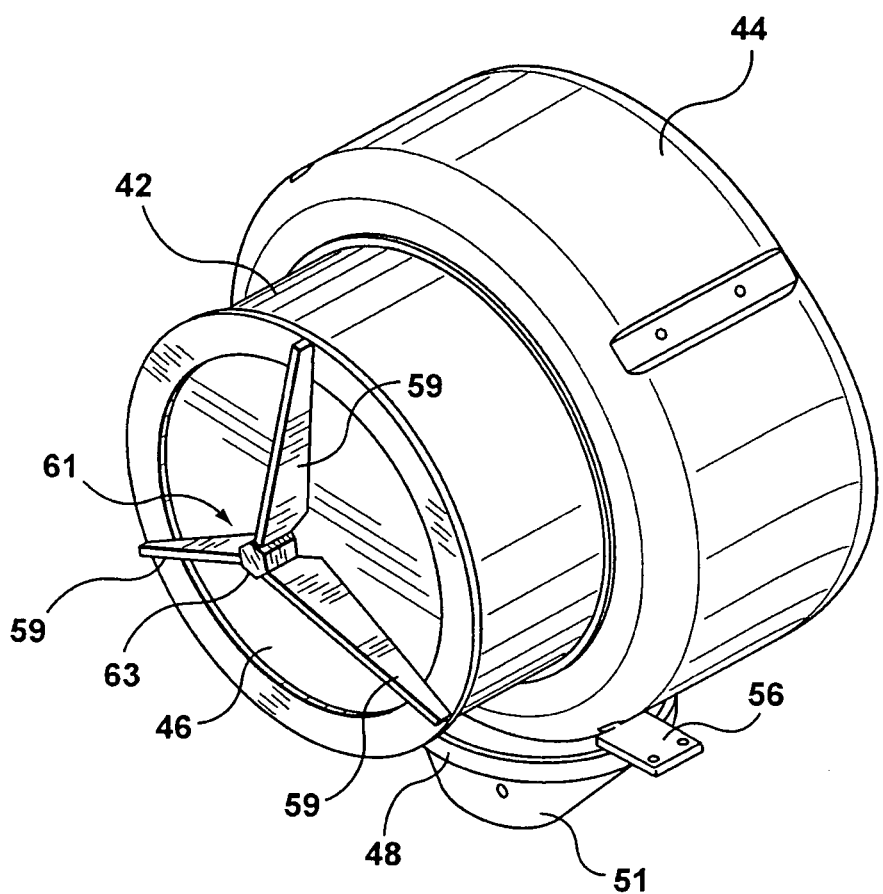
FIG. 5 is a top perspective view of the blower plenum of FIG. 4.

When in the closed position as shown in FIGS. 4 and 5, impeller 62 may be efficiently operated as it is under a minimal load because the valve sleeve 42 substantially prevents air from entering the plenum 44 and placing a load on the impeller. Controlling the air intake necessarily results in control of the air exiting the plenum 44 via the exit port 48, providing the ability to control the airflow without starting and stopping the blower motor. Advantageously, controlling the air at the plenum 44 inlet may reduce or avoid potential problems created by back-pressure and may reduce stresses imparted on the impeller and other blower components. Furthermore, when blower 30 is operated with sleeve 42 in the closed position, the noise is substantially reduced due to the substantial reduction of air exiting blower 30.

Figure 7:
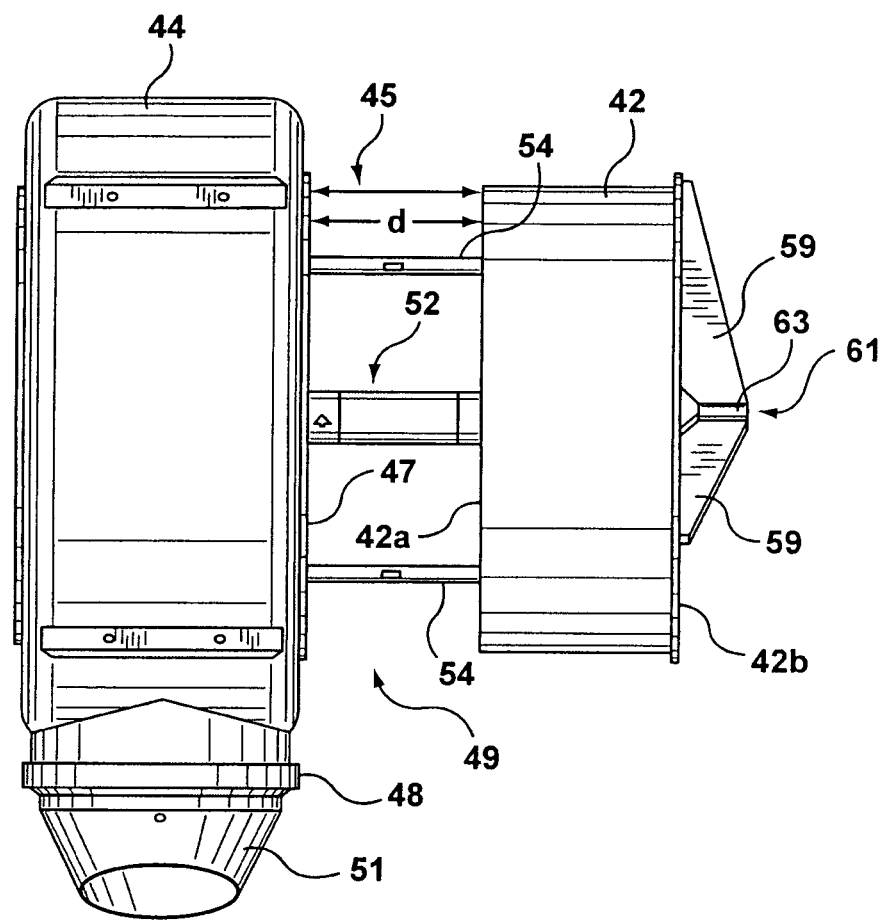
FIG. 7 is a side view of the blower plenum of FIGS. 4 and 5, with the air inlet control device shown in the open position.
Figure 9:
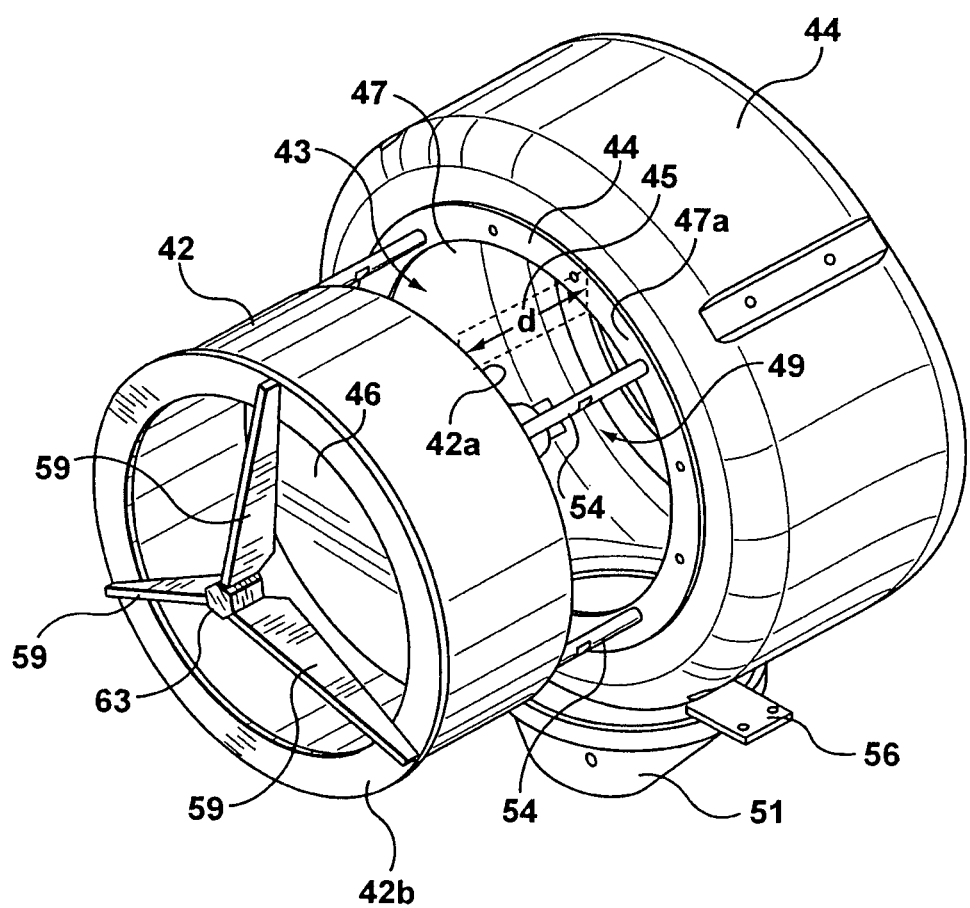
FIG. 9 is a top perspective view of the blower plenum of FIGS. 4 and 5.
Figure 10:
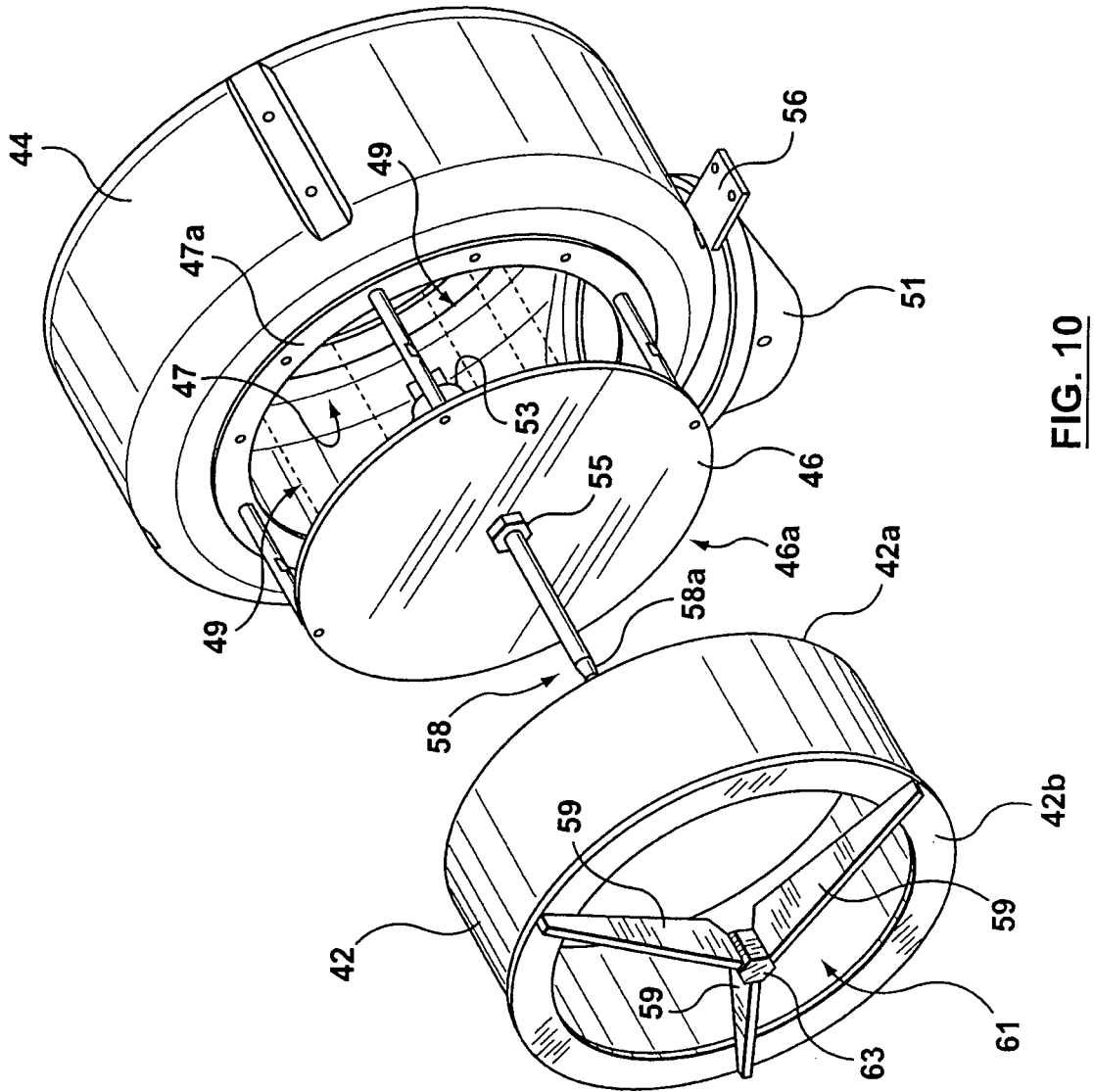
FIG. 10 is a partially exploded perspective view of the blower plenum of FIGS. 4 and 5.
Figure 11:
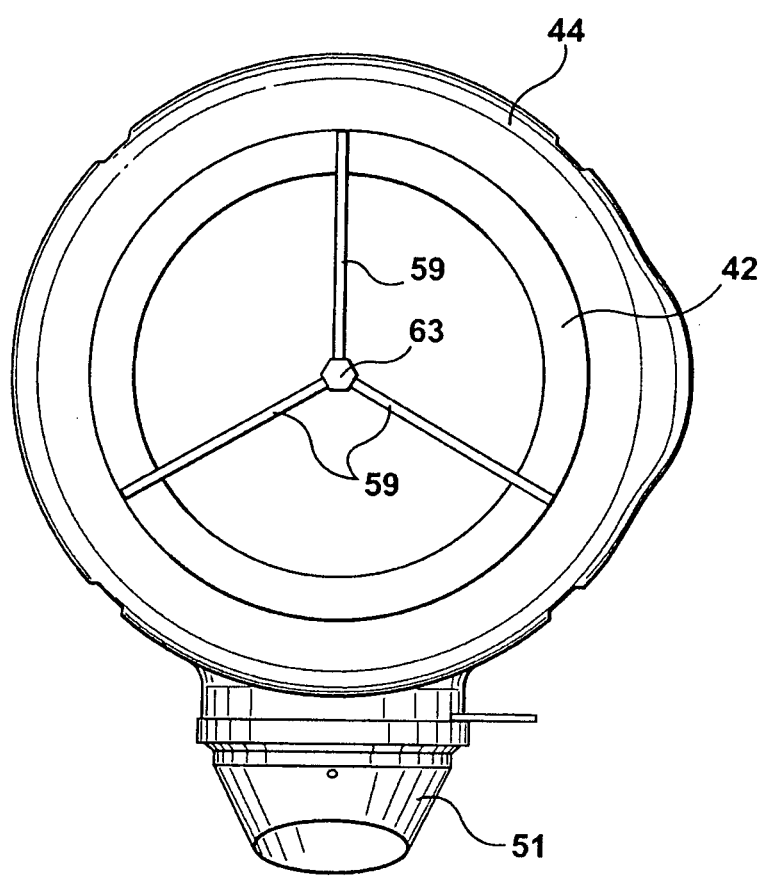
FIG. 11 is a front view of the blower plenum of FIGS. 4 and 5.
Figure 12:
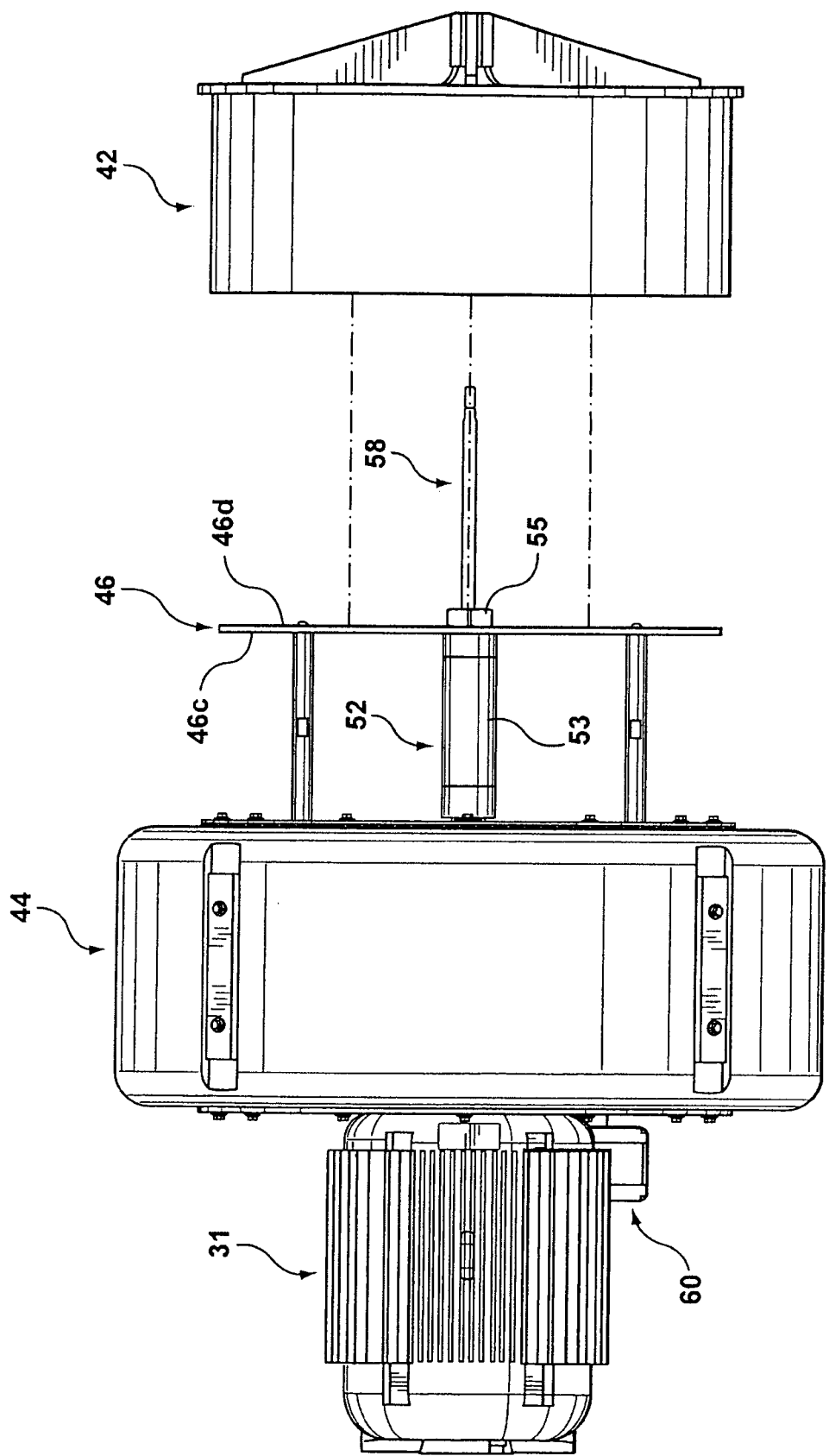
FIG. 12 is a top view exploded view of the blower and motor assembly of FIG. 8.

FIGS. 7, 8 and 9 illustrate the blower plenum 30 in the open or operable position, exposing the inlet region 49. The valve sleeve 42 may be axially spaced at a distance d from the plenum 44 in the operable position. In the operable position, air is permitted to enter the plenum 44 via the air inlet 45 and exit the plenum 44 via the exit port 48. Moreover, translating the sleeve 42 in the axial direction, while the blower motor is continuously operating; allows the blower 30 airflow to be rapidly turned on and off. The relative area of inlet 45 when the sleeve is fully open to the area of cavity inlet 47 may be relatively high. For example, a circular cavity inlet 47 may have a diameter D of in the range of approximately 10"-11" inches and the maximum distance d when the sleeve is in the operable position may be in the range of approximately 2" to 3" inches. A ratio of D/d may be in the range of about 3.3:1 to 5.5:1. Thus, by providing a large enough inlet opening 45, air may not be restricted at the air inlet opening when flowing into cavity opening 47.

The blower 30 may exhibit a predictable relationship between the axial movement of sleeve 42 and the area exposed of inlet 45. Thus if the distance d is doubled, the area of inlet 45 that is exposed may also approximately double. This permits the airflow entering plenum 44 and exiting the exit port 48 to be readily controlled, by simply controlling the axial distance d between the inward facing surface 42a of valve sleeve 42 and the edge 47a of plenum opening 47 (i.e. the size of inlet opening 45).

Additionally, as air can be drawn into inlet region 49 from all around the cylindrical opening 45, the airflow into region 49 and also through inlet 47 can be fairly uniform. The result is that no matter what the position of the valve sleeve 42, the air flow into plenum 44 will be quite evenly distributed, thus providing relatively even loading on impeller 62.

It may be appreciated that as a result of the compact nature of the inlet restriction and similar profile to existing blowers, blower 30 may be particularly suitable to be retrofitted in the drying section 22 of existing wash systems 10. The ability to readily retrofit, results at least in part from the movement of the valve sleeve 42 that may be confined to the axial direction parallel to, and which may be aligned with, the fan blade axis of rotation. Additionally, blower 30 is particularly suitable for use in retrofitting existing drying sections because it can operative effectively in a number of different orientations. Therefore, a wash facility employing legacy blowers could be upgraded by simply replacing the legacy blowers with novel blowers 30, coupled with suitable modifications to the control system.

It should be noted that blower 30 may not require additional space above the plenum when compared to a standard blower found in most vehicle wash systems today. This can be important because blowers in existing systems may be positioned immediately above each other, as shown for example in FIG. 3, or alternatively close to the facility roof. In either of these scenarios there may be insufficient space to install a modified blower 30 with a control system that requires additional space directly above the plenum.

Accurate control of the airflow exiting the blower 30 may also permit the drying section 22 conditions to be readily selected and optimized depending on the characteristics of the vehicle to be dried and also the location of the vehicle relative to the drying section 22. For example, certain types of vehicles or components or parts of certain vehicles may be vulnerable to damage resulting from high velocity airflow including convertible roofs, and covers used with pickup trucks. A vehicle's position and/or certain characteristics of the vehicle may be determined by sensors such as for example, photo detectors. Sensors may also be employed to determine what type of vehicle from several different types of vehicles, is in the drying section of the vehicle wash system. The signals produced by the sensors may be transmitted to system controller 19 which can then operate the blowers in a predetermined manner that is appropriate for the vehicle position, characteristics or type. Alternatively, certain vehicle types and/or characteristics and other data may be manually inputted into the system by a car wash attendant or the vehicle occupants.

It may also be desirable to vary the airflow exiting the blower 30 in response to the distance between vehicles in the wash system 10, or the speed at which vehicles progress through the wash system 10.

Figure 14:
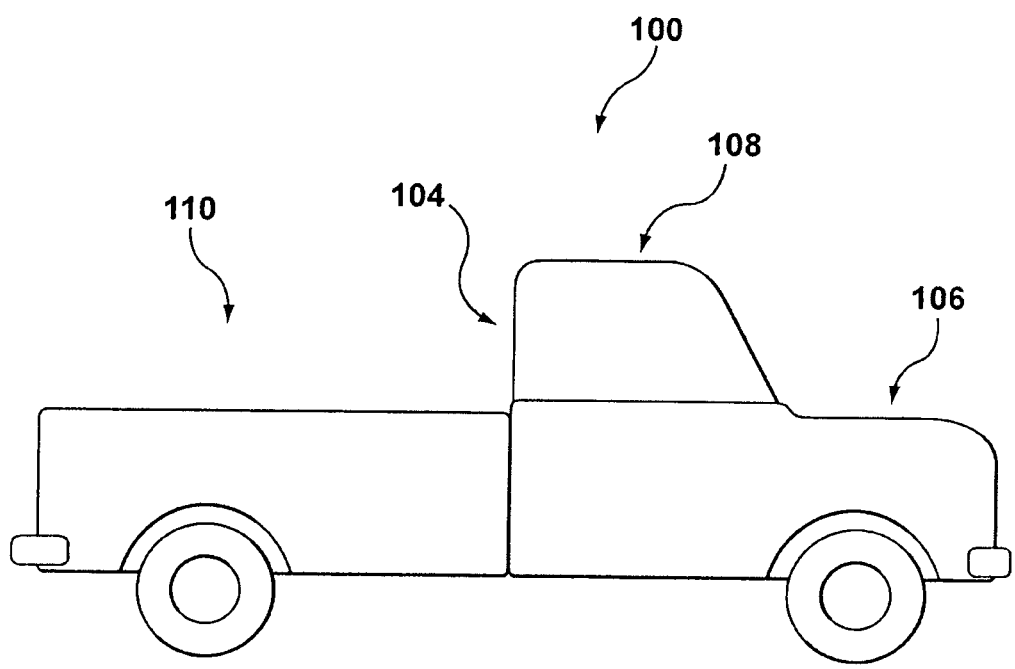
FIG. 14 is a side schematic view of a pickup truck.

The ability to rapidly vary the airflow exiting a blower 30 automatically is particularly desirable when drying pickup trucks. As schematically illustrated in FIG. 14, a pickup truck 100 has a hood 106, a cab 108, and a bed 110. It may be desirable to operate a blower 30 under different conditions, for different parts of a pickup truck 100.

A high velocity airflow may be applied to the portions of a vehicle that are in a condition appropriate for drying until the vehicle is identified as a pickup truck. For example, it is generally desirable to operate a blower 30 in a first condition so that a high velocity and volume airflow exits the blower 30 for portions of a vehicle that are in a condition appropriate for drying. For a pickup truck 100, a high velocity and volume airflow would be applied when the hood 106 and cab 108 are in a condition appropriate for drying, as the system may not initially be able to distinguish pickup trucks from other vehicle types.

Similarly, once the vehicle has been identified as a pickup truck 100, it may be desirable to operate a blower 30 in a second condition so that a relatively low velocity airflow exits the blower 30 when the bed 110 of pickup truck 100 is in a condition appropriate for drying. Drying the bed 110 of pickup truck 100 with a relatively low velocity and volume airflow may be advantageous to substantially remove standing water from the bed of the pickup truck without substantially disturbing other materials already present in the bed of a pickup truck upon entering the wash facility. Such a method could be employed with a variety of blower systems, and it not intended to be limited to the particular structures explicitly described herein. However, using the system disclosed above, control system 19 may, upon receiving appropriate signals from sensors in the vehicle drying section, adjust the position of the valve sleeve 42 to modify the size of inlet opening 45. Sensors can also be employed to determine that a vehicle is no longer in a condition appropriate for drying the vehicle. The system controller 19 can then, in response thereto, move the sleeve to vary the distance thereby closing the inlet opening 45 to substantially prevent air from being drawn through the inlet opening.

It has been found that operating a blower 30 with a valve sleeve 42 in the fully "closed" position may in some embodiments be suitable for drying the bed of a pickup truck. Even with a valve sleeve 42 in the fully closed position, so that distance d is substantially zero or a very small distance, a residual airflow still may exit from a blower 30. Accordingly, one or more blowers 30 in a drying section, may provide a sufficient airflow to adequately remove standing water the bed 110 of a pickup truck 100 with the valve sleeve 42 in the closed position without substantially disturbing other items in the bed 110. As an aside, it should be noted that in the car wash industry the term "to dry" does not necessarily require that all traces of moisture be removed from a surface—to dry a surface is means to remove at least at least some moisture from the surface.

Alternatively, it may be desirable in certain applications to operate blower 30 with valve sleeve 42 translated a distance d, that is intermediate distance between the maximum and minimum displacements of the valve sleeve 42, to provide a desired airflow to certain parts of a vehicle that is less than the maximum airflow when the valve sleeve 42 is fully open. When valve sleeve 42 is positioned at an intermediate position to dry certain parts of a vehicle, the blower may be operated in a total of three different conditions. Alternatively, the system controller can be programmed to control the movement of the sleeve 42 so that it can be set at more than three or more different positions to accommodate several desired drying conditions.

In drying a pickup truck 100, it may be necessary to distinguish between the bed 110 and other portions of a pickup truck 100, when seeking to operate one or more blowers 30 under different conditions, each different condition dependent upon the portion of a pickup truck 100 that is in a condition appropriate for drying. More specifically, it may be of assistance to identify the transition between the cab 108 and the bed 110 of a pickup truck 100, defined by the rear edge 104 of the cab 108.

Figure 13:
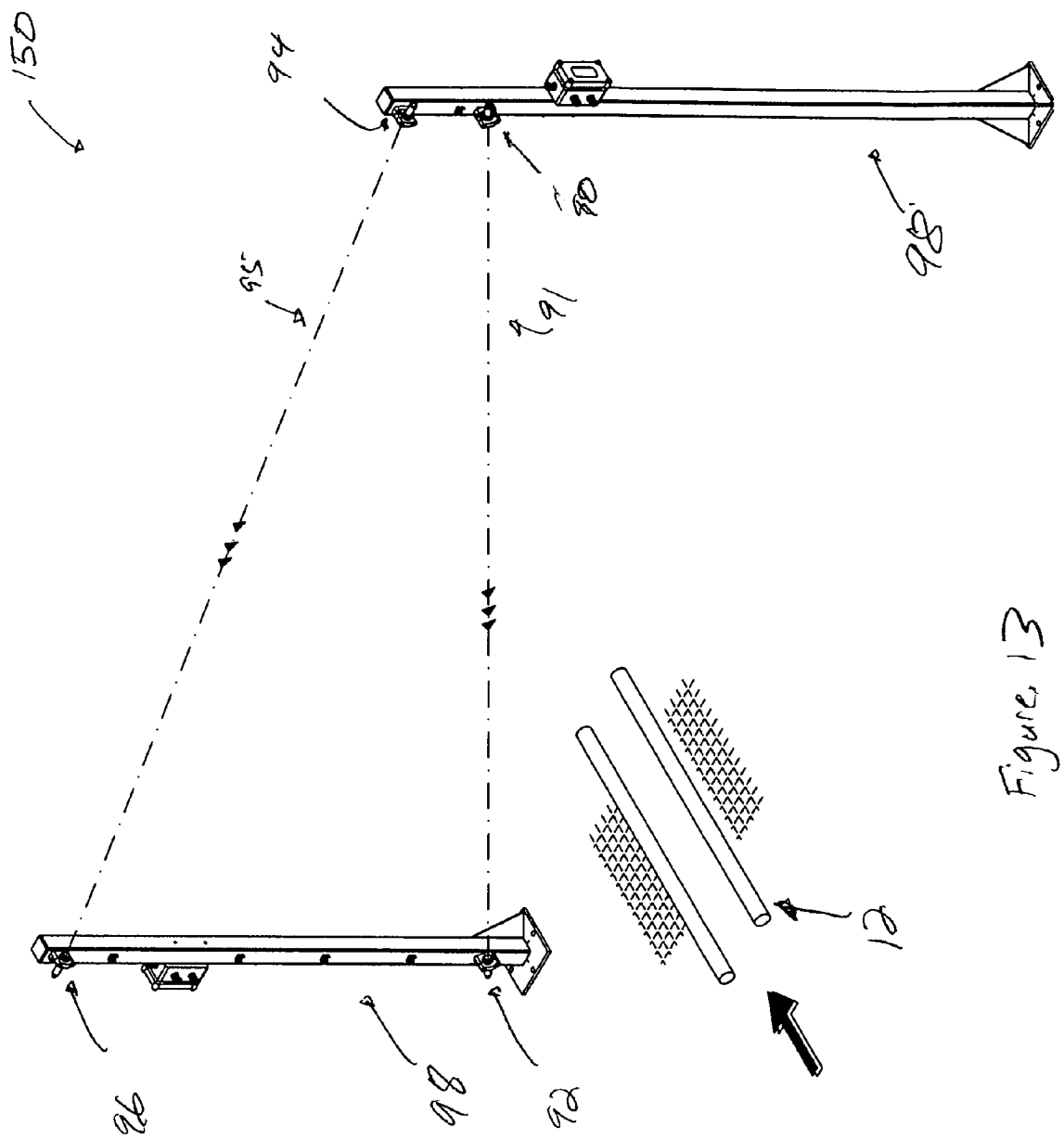
FIG. 13 is a perspective view of one embodiment of a system to detect the presence or type of a vehicle.
Figure 13A:
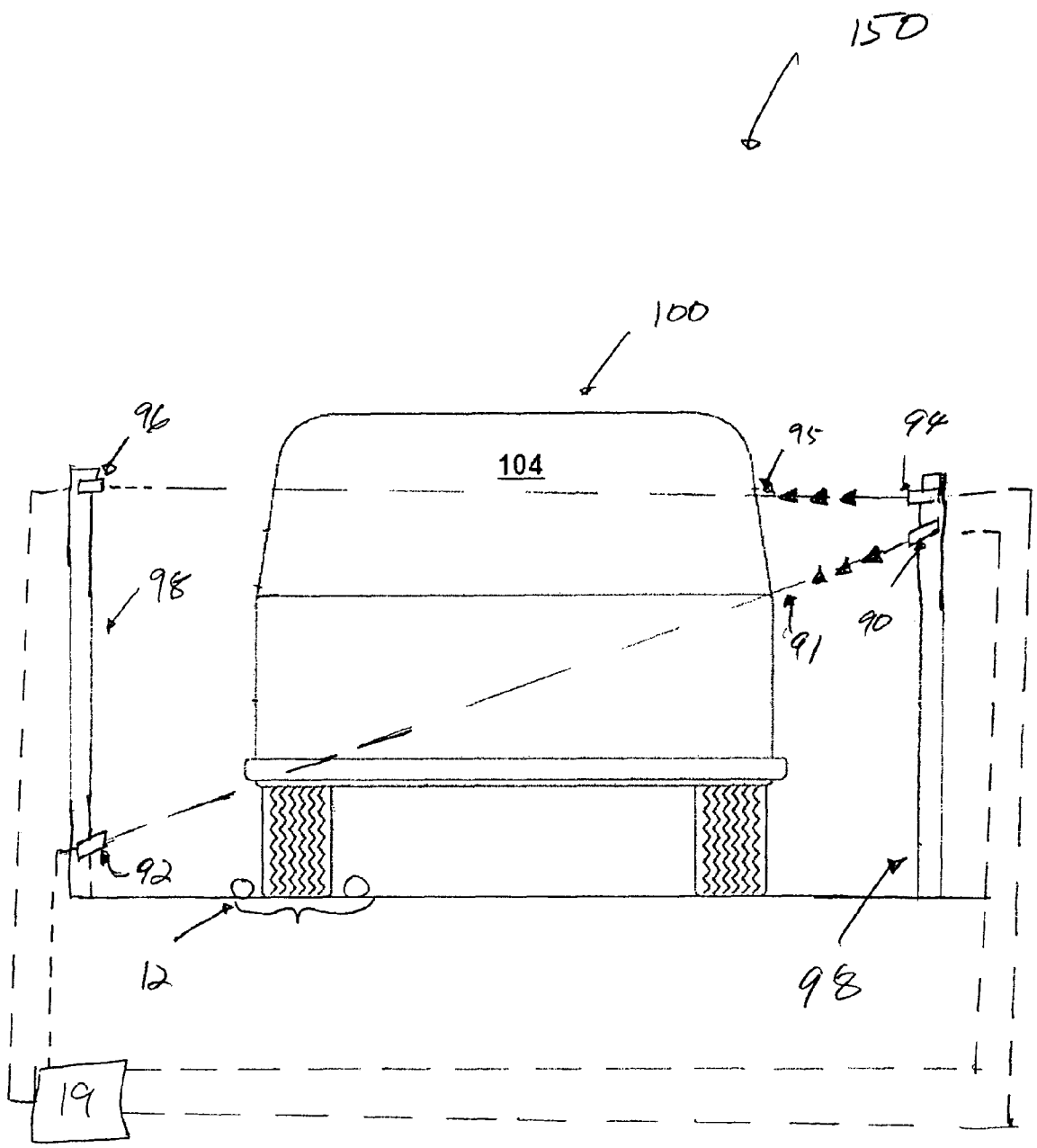
FIG. 13A is a rear schematic view of a pickup truck and the detector system of FIG. 13.

There are different known methods for identifying the presence of a pick up truck and locating the different locations of the cab and the bed. One method, suitable for use in a conveyor or tunnel type wash facility, to identify the rear edge 104 of the cab 108, or more generally to distinguish between the cab 108 and bed 110 of a pickup truck 100, is described with reference to FIG. 13. The abrupt transition from cab 108 to bed 110 of a pickup truck 100 is a characteristic feature of pickup trucks and is useful in distinguishing pickup trucks from other vehicle types. Other suitable methods may be possible in a conveyor or tunnel type wash facility, or with suitable modification to a "rollover" type wash facility. The systems described and referenced below, and also other systems, may also operate in conjunction with other control systems and detection systems known in the art. For example, the distance between the rear edge 104 and the front of the pickup truck 100 may be determined by other means, and communicated to the drying section or system controller 19, in order to operate blower 30 under different conditions for different parts of the pickup truck 100.

More generally, the relationship between the upper and lower portions of a pickup truck may be used to distinguish pickup trucks from other vehicles. The upper portion of a pickup truck is generally comprised of a relatively short cab portion compared to the lower portion of the pickup truck, which generally corresponds to the overall vehicle length. By monitoring the relative lengths of the upper and lower portions of a vehicle, a pick up truck can be identified.

With reference again to FIG. 13, a photosource 94 and photodetector 96 may be configured in a circuit commonly known as an electronic eye, with a beam 95 transmitted by photosource 94 and received by photodetector 96, as is known. Examples of suitable photosource and photodetector devices that may be employed are the model IR 110-2 made by MacNeil Wash Systems. If no object is present to interrupt beam 95, beam 95 is said to be in the received state. If an object is positioned to prevent transmission of beam 95 from photosource 94 to photodetector 96, beam 95 is said to be in the interrupted state. Similarly, photosource 90 and photodetector 92 may be connected so that beam 91 is transmitted by photosource 90 and may be received by photodetector 92 under certain conditions. Signals corresponding to the received and interrupted states can be transmitted on an ongoing basis to a system controller 19. Photosources and photodetectors may be mounted to stanchions 98, or otherwise suitably positioned in the wash system 10.

Beam 95 may be used to detect the upper portion of a vehicle. Beam 91 may be used to detect the lower portion of a vehicle. Beam 91 may be inclined in order to provide a more accurate indication of when a vehicle is present. Having beam 91 inclined is advantageous as it minimizes the possibility of a portion of a vehicle being present and not detected. This could occur if beam 91 was transmitted through glass if beam 91 were not inclined so as to refract through any glass components of a vehicle.

The relative proportions of the upper and lower portions of a vehicle may be measured by beams 95 and 91 and system controller 19 as a vehicle passes by stanchions 98 and past detection system 150. The length or relative length of the upper portion of a vehicle may be defined by the cab portion, where the vehicle is a pickup truck 100, since beam 95 will transition from the received state to the interrupted state as the front portion of cab 108 moves past beam 95. Beam 95 will remain in the interrupted state until the rear edge 104 of cab 108 pass beam 95 and beam 95 transitions to the received state. The transitions of beam 95 from the received state to interrupted state and vice versa may be monitored by system controller 19. It is not critical to calculate the actual length of the upper portion, as the lower portion will progress through beam 91 at the same rate, however, it is desirable for a pickup truck 100 to travel past detection system 150 at a constant rate to simplify calculations by system controller 19. Similarly, the length or relative length of the lower portion may be determined by the transitions of beam 91 by other components of the vehicle.

System controller 19 in conjunction with detection system 150 may then determine that a vehicle is a pickup truck by comparing the relative dimensions or times of passage of the upper and lower portions of the vehicle as it passes through beams 91 and 95. If the upper portion of the vehicle/time is greater than U and the lower portion/time is greater than L a reliable indication that the vehicle present is a pickup truck may be determined. The specific dimensions of U and L are dependent upon the dimensions of pickup trucks currently being marketed by vehicle manufactures, and can be determined by persons skilled in the art or modified as the dimensions of pickup trucks change over time.

In other embodiments, ultrasonic range finders may be used to measure the height of an upper surface and thus determine the contour of the upper surface of a vehicle in order to detect a vehicle type, including identifying a pickup truck. A pickup truck may be determined by the abrupt transition at the rear edge 104 of the cab 108 by measuring the distance relative to at least two range finders as a vehicle progresses through a detection system. Upon detection of an abrupt transition the system may be able to recognize that a pickup truck is present and take appropriate action or transmit information to a system controller to be used in subsequent processing steps. More specifically, at least two range finders may be positioned in different transverse planes. Transverse planes as used herein may refer to a plane that is transverse to the direction of relative motion of a vehicle and a detection system. Further details of such one exemplary system using ultrasonic range finders is described in U.S. Pat. No. 5,886,648, the contents of which are hereby incorporated herein by reference. Another system employing ultrasonic range finders to detect vehicle types is disclosed in U.S. Pat. No. 5,173,692, the contents of which are hereby incorporated herein by reference. The disclosure of the '692 patent may be modified by a person skilled in the art to detect the abrupt transition typical of pickup trucks and take appropriate action in drying the pickup truck by persons skilled in the art.

Upon a vehicle being identified as a pickup truck, appropriate control information may then be directed by system controller 19 to one or more blowers 30 so that the blowers may be operated in one or more different conditions. Specifically, one or more blowers 30 may be adjusted from a first airflow rate appropriate for drying the hood 106 and cab 108 of pickup truck 110 to a second lower airflow rate appropriate for drying the bed 110 of pickup truck 110. Additionally, controller 19 may, depending upon the specific condition identified, only cause selected blowers 30 of the entire group of blowers 30 to be operated.

Alternatively, in wash facilities having an attendant, the attendant can control the blower operation so that blower 30 or blowers 30 of drying section 22 are operated in a different condition to dry the bed 110 of a pickup 100. The attendant may also modify the drying conditions for other types of vehicles or other factors such as the weather, time of day, etc.

A variety of methods may be used to generate an input to the blower control system indicating that the blower should be in the operable or standby position. For example, the blower control system may interface with the wash system control system in order to obtain the necessary control information. Alternatively, sensing mechanisms, such as electronic eyes, may be employed independent of the wash system control system to determine the position of a vehicle in the wash system and respond appropriately by sending a signal directly to a controller or controllers associated with one or more blowers.

In summary, the blower configuration described above may regulate the airflow exiting the blower by controlling the airflow entering the blower at the inlet port while the blower motor is operated continuously. The blower configuration may also allow existing systems to be easily retrofitted because of its profile, compact design, and ability to be mounted in a variety of different orientations. Moreover, the blower configuration permits the size of the airflow inlet opening to be predictably varied by a linear change to an inlet control device. A benefit is that an appropriate setting for the size of the inlet area may easily be obtained.

The blower configuration described and illustrated herein, may be a relatively simple and compact design that can maintain a uniform load over the impeller and may not significantly disturb the air uniformity entering the cavity opening. Consequently, adequate durability and readily predictable performance may be obtained when the blower is operated over a range of operating conditions, rather than being limited to the maximum and minimum air flows provided by the blower.

The ability to sustainably and predictably operate a blower with a varied airflow employing a constant speed motor allows for optimization of the blower characteristics depending upon a number of factors, including the type of vehicle, the portion of the vehicle being cleaned, and the speed at which vehicles progress through the wash system.

The present blower configuration can also be more compact than known blower systems in imparting a uniform load over the impeller when in a partially open or closed position. The airflow entering the blower can remain relatively uniform, as the distance d varies, permitting the valve sleeve, or more generally the intake restriction means, to be positioned relatively closely to the impeller while maintaining adequate performance.

The blower and various methods of operation described above may be suitable for use in either a conveyor or tunnel type wash facility, and also in a "rollover" type wash facility. For example, the position in of a vehicle in a conveyor type wash facility may determine when it is in a condition appropriate for drying. Alternatively, in a "rollover" type wash facility, the vehicle may be in a condition appropriate for drying when other desired operations are completed.

Although not specifically described in detail herein, suitable modifications may be made to the embodiments described by persons skilled in the art depending on the type of wash facility, and otherwise, being used for a particular application. Of course, the foregoing embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A blower for use in a vehicle wash system, said blower comprising:
a plenum having a cavity inlet opening, an exit port and an interior cavity;
an impeller positioned inside said interior cavity, said impeller, when driven by a motor, being operable to draw air into said cavity through said cavity opening, compress said air, and then emit an airflow from said plenum through said exit port;
a baffle member positioned in fixed spaced, generally parallel relation to said cavity opening and defining an inlet region between said baffle member and said cavity opening, said baffle member having a peripheral edge and said plenum having an outward facing surface portion proximate said cavity opening;
a valve sleeve mounted on and surrounding said peripheral edge of said baffle member in sufficiently close proximity to provide a substantial air seal, said valve sleeve being movable axially relative to said baffle member, said valve sleeve having an inner surface, said inner surface of said valve sleeve and said outward facing surface of said plenum defining an inlet opening to said inlet region, and there being an inlet opening distance defined as a distance between said inner surface of said sleeve and said outward facing surface of said plenum; and
a reciprocating movement device interconnected to said valve sleeve, said device operable to axially move said sleeve to vary said distance, thus varying said inlet opening distance
wherein during operation of said blower, substantially all the air drawn into said cavity passes through said inlet opening to said inlet region.

2. An apparatus as claimed in claim 1 wherein said reciprocating movement device is mounted on said baffle plate and is interconnected to said valve sleeve.

3. An apparatus as claimed in claim 2 wherein said reciprocating device is generally axially aligned with a drive shaft of said impeller.

4. An apparatus as claimed in claim 1 wherein said reciprocating movement device is a cylinder mounted on said baffle member and having an extendible piston arm attached to said sleeve for moving said sleeve axially towards and away from said cavity opening, so as to vary said inlet opening distance.

5. An apparatus as claimed in claim 4 wherein said piston arm is generally axially aligned with a drive shaft of said impeller.

6. An apparatus as claimed in claim 1 wherein the relationship between a variation in said distance and a variation in said size of said inlet opening is predictable.

7. An apparatus as claimed in claim 1 wherein said baffle member is a continuous baffle plate.

8. An apparatus as claimed in claim 1, further comprising a nozzle in fluid communication with said exit port to emit said compressed air.

9. An apparatus as claimed in claim 1, wherein said reciprocating movement device is controlled by a controller operable to vary said inlet opening distance.

10. A vehicle wash system having a drying station comprising:
(i) a frame;
(ii) a blower mounted on said frame for blowing liquid from the surface of a vehicle comprising:
a plenum, having a cavity opening, an exit port, and an interior cavity;
an impeller positioned inside said cavity, said impeller, when driven by a motor, being operable to draw air into said cavity through said cavity opening, compress said air, and then emit an airflow from said plenum through said exit port;
an inlet region formed proximate said cavity opening and in communication with said cavity, said inlet region having an inlet opening;
a movement apparatus operable to move a member axially relative to said inlet opening to vary the size of said inlet opening to thereby vary the air drawn into said inlet opening;
(iii) a motor for driving said impeller of said blower;
(iv) a sensor system operable to detect the presence and/or absence of a vehicle at said drying system;
(v) a controller in communication with said sensor system, and said controller being operable to control the movement of said movement device dependent upon the presence and/or absence of a vehicle to be dried at said drying station to thereby control the air drawn into said inlet opening.

11. A system as claimed in claim 10 wherein said blower further comprises a baffle member positioned in fixed spaced, generally parallel relation to said cavity opening and defining an inlet region between said baffle member and said cavity opening, said baffle member having a peripheral edge and said plenum having an outward facing surface portion proximate said cavity opening;
and wherein said inlet region being formed by a valve sleeve mounted on and surrounding said peripheral edge of said baffle member in sufficiently close proximity to provide a substantial air seal, said valve sleeve being movable axially relative to said baffle member, said valve sleeve having an inner surface, said inner surface of said valve sleeve and said outward facing surface of said plenum defining an inlet opening to said inlet region, and there being an inlet opening distance defined as a distance between said inner surface of said sleeve and said outward facing surface of said plenum;
wherein said movement device comprises a reciprocating movement device interconnected to said valve sleeve, said device operable to axially move said sleeve to vary said distance, thus varying the size of said inlet opening.

12. A system as claimed in claim 11 wherein said reciprocating device is generally axially aligned with a drive shaft of said impeller.

13. An system as claimed in claim 11 wherein said reciprocating movement device is a cylinder mounted on said baffle member and having an extendible piston arm attached to said sleeve for moving said sleeve axially towards and away from said cavity opening, so as to vary said inlet opening distance.

14. An system as claimed in claim 13 wherein said piston arm is generally axially aligned with a drive shaft of said impeller.

15. A system of drying a pickup truck in a wash system comprising:
- (a) a blower system comprising a blower as claimed in claim 1;
- (b) a sensor system;
- (c) a control system;
- said sensor system operable to communicate signals to said control system such that said control system can determine that a vehicle is in a condition appropriate for drying;
- said control system, in response to said determining said vehicle is in a condition appropriate for drying, operable to operate said blower in a first condition to provide a first airflow to the portion of vehicle in a condition appropriate for drying;
- said sensor system operable to communicate signals to said control system such that said control system can determine that said vehicle is a pickup truck;
- said control system, in response to said determining that said vehicle is a pick up truck, operable to operate said blower in a second condition to provide a second airflow to said pickup truck.

16. A system as claimed in claim 15 wherein said sensor system comprises:
- a first photosource and a first photodetector configured as a first electronic eye and operable to detect an upper portion of said pickup truck;
- a second photosource and a second photodetector configured as a second' electronic eye and operable to detect a lower portion of said pickup truck;
- and wherein said control system receives signals relating to relative lengths of said upper portion and said lower portion to identify that said vehicle is a pickup truck.

17. The system of claim 16 wherein said second electronic eye is inclined.

18. The system of claim 16 wherein said sensor system comprises:
- a first range finder positioned above a vehicle and operable to measure the vertical distance from said first range finder to a first point on an upper surface of said vehicle;
- a second range finder positioned above a vehicle and operable to measure the vertical distance from said second range finder to a second point on the upper surface of said vehicle;
- wherein in operation, said first range finder and said second range finder are positioned in different transverse planes and said relative heights measured by said first range finger and said second range finder are used to identify a pickup truck.

* * * * *

UNITED STATES PATENT AND TRADEMARK OFFICE
CERTIFICATE OF CORRECTION

PATENT NO. : 8,621,707 B2  
APPLICATION NO. : 12/382617  
DATED : January 7, 2014  
INVENTOR(S) : Daniel J. MacNeil Page 1 of 1

It is certified that error appears in the above-identified patent and that said Letters Patent is hereby corrected as shown below:

In the Claims

Column 18
Claim 16, line 7, replace "a second' electronic" with --a second electronic--
Claim 18, line 26, replace "finger" with --finder--

Signed and Sealed this
Eighth Day of April, 2014

Michelle K. Lee
*Deputy Director of the United States Patent and Trademark Office*